United States Patent [19]
Cheng

[11] Patent Number: 6,155,376
[45] Date of Patent: *Dec. 5, 2000

[54] ELECTRIC POWER STEERING ASSEMBLY

[75] Inventor: Wangquan Cheng, Troy, Mich.

[73] Assignee: TRW Inc., Lyndhurst, Ohio

[ * ] Notice: This patent is subject to a terminal disclaimer.

[21] Appl. No.: 09/221,046

[22] Filed: Dec. 28, 1998

[51] Int. Cl.⁷ .................................................... B62D 5/04
[52] U.S. Cl. ........................ 180/444; 74/409; 74/396; 74/89.13; 74/89.15; 74/499
[58] Field of Search ................................ 180/444, 431, 180/400, 443, 446, 79.1; 74/409, 396

[56] References Cited

U.S. PATENT DOCUMENTS

| | | | |
|---|---|---|---|
| 3,882,949 | 5/1975 | Anderson | 180/8 A |
| 4,415,054 | 11/1983 | Drutchas | 180/79.1 |
| 4,666,014 | 5/1987 | Carlson et al. | 180/148 |
| 4,694,925 | 9/1987 | Roberts | 180/79.1 |
| 4,987,963 | 1/1991 | Oslapas et al. | 180/79.1 |
| 5,165,495 | 11/1992 | Fujii | 180/79.1 |
| 5,437,349 | 8/1995 | Kurahashi et al. | 180/79.1 |
| 5,445,237 | 8/1995 | Eda et al. | 180/79.1 |
| 5,492,191 | 2/1996 | Birsching | 180/79.1 |
| 5,743,145 | 4/1998 | Terada et al. | 74/409 |
| 5,921,344 | 7/1999 | Boyer | 180/444 |
| 5,975,234 | 11/1999 | Bugosh et al. | 180/444 |

FOREIGN PATENT DOCUMENTS 2146300  4/1985  United Kingdom.

*Primary Examiner*—J. J. Swann
*Assistant Examiner*—J. Allen Shriver
*Attorney, Agent, or Firm*—Tarolli, Sundheim, Covell, Tummino & Szabo L.L.P.

[57] ABSTRACT

A steering assembly (10) for turning steerable wheels of a vehicle in response to rotation of a vehicle steering wheel (11) comprises a housing (30) and a member (32) which is movable axially within the housing to effect turning movement of the steerable wheels. The member (32) has an externally threaded screw portion (40). A ball nut (72) is disposed in the housing (30). The ball nut (72) extends around the screw portion (40) and has an internal thread (90). Balls (98) are disposed between the internal thread (90) on the ball nut (72) and the externally threaded screw portion (40) for transmitting force between the ball nut and the screw portion to cause axial movement of the member (32). An electric motor (60) provides a drive force to move the member (32) in response to rotation of the steering wheel (11). Gearing (112, 114) transmits the drive force of the electric motor (60) to the ball nut (72).

29 Claims, 4 Drawing Sheets

ELECTRIC POWER STEERING ASSEMBLY

TECHNICAL FIELD

The present invention relates to an electric power steering assembly and, in particular, relates to an electric power steering assembly which includes a ball nut for transmitting force from an electric motor to a steering rack to cause steerable vehicle wheels to turn.

BACKGROUND OF THE INVENTION

One known electric power steering apparatus for turning steerable wheels of a vehicle includes a ball nut for transmitting force between an axially movable rack member and an electric motor. Upon actuation of the electric motor, the ball nut is driven to rotate relative to the rack member. The rotational force of the ball nut is transmitted to the rack member by balls to drive the rack member axially. Axial movement of the rack member effects turning movement of the steerable wheels. The advantages of this known apparatus include its compact size and high strength.

In another known electric power steering apparatus, an electric motor is connected with gearing which provides a gear reduction between an electric motor shaft and an output pinion meshed with an axially movable rack member. Rotation of the output pinion by the electric motor causes the rack member to move axially to turn the steerable wheels. The advantages of this known apparatus include a high gear reduction ratio and relatively low cost.

It is desirable to produce an electric power steering system which is compact in size, relatively inexpensive to produce, and which has high strength and a high gear reduction ratio.

SUMMARY OF THE INVENTION

The present invention is a steering assembly for turning steerable wheels of a vehicle in response to rotation of a vehicle steering wheel. The steering assembly comprises a housing and a member which is movable axially within the housing to effect turning movement of the steerable wheels. The member has an externally threaded screw portion. A ball nut is disposed in the housing. The ball nut extends around the screw portion of the member and has an internal thread. A plurality of balls are disposed between the internal thread on the ball nut and the externally threaded screw portion of the member for transmitting force between the ball nut and the screw portion to cause axial movement of the member. An electric motor provides a drive force to move the member in response to rotation of the steering wheel. The electric motor includes a rotatable output shaft which is rotatable about a motor axis which extends transverse to the member. Gearing transmits the drive force of the electric motor to the ball nut. The gearing provides a first gear reduction between the output shaft of the electric motor and the ball nut.

An input shaft is connected between the pinion and the vehicle steering wheel and a torque sensor is operatively coupled with the input shaft. The torque sensor is operable to sense rotation and steering torque applied to the input shaft and to provide a corresponding electrical signal. A controller is electrically connected to the torque sensor and to the electric motor. The controller is operable to receive electrical signals from the torque sensor and to control the electric motor in accordance with the electrical signals.

BRIEF DESCRIPTION OF THE DRAWINGS

The foregoing and other features of the present invention will become apparent to those skilled in the art to which the present invention relates upon reading the following description with reference to the accompanying drawings, wherein.

DESCRIPTION OF PREFERRED EMBODIMENTS

Figure 1:
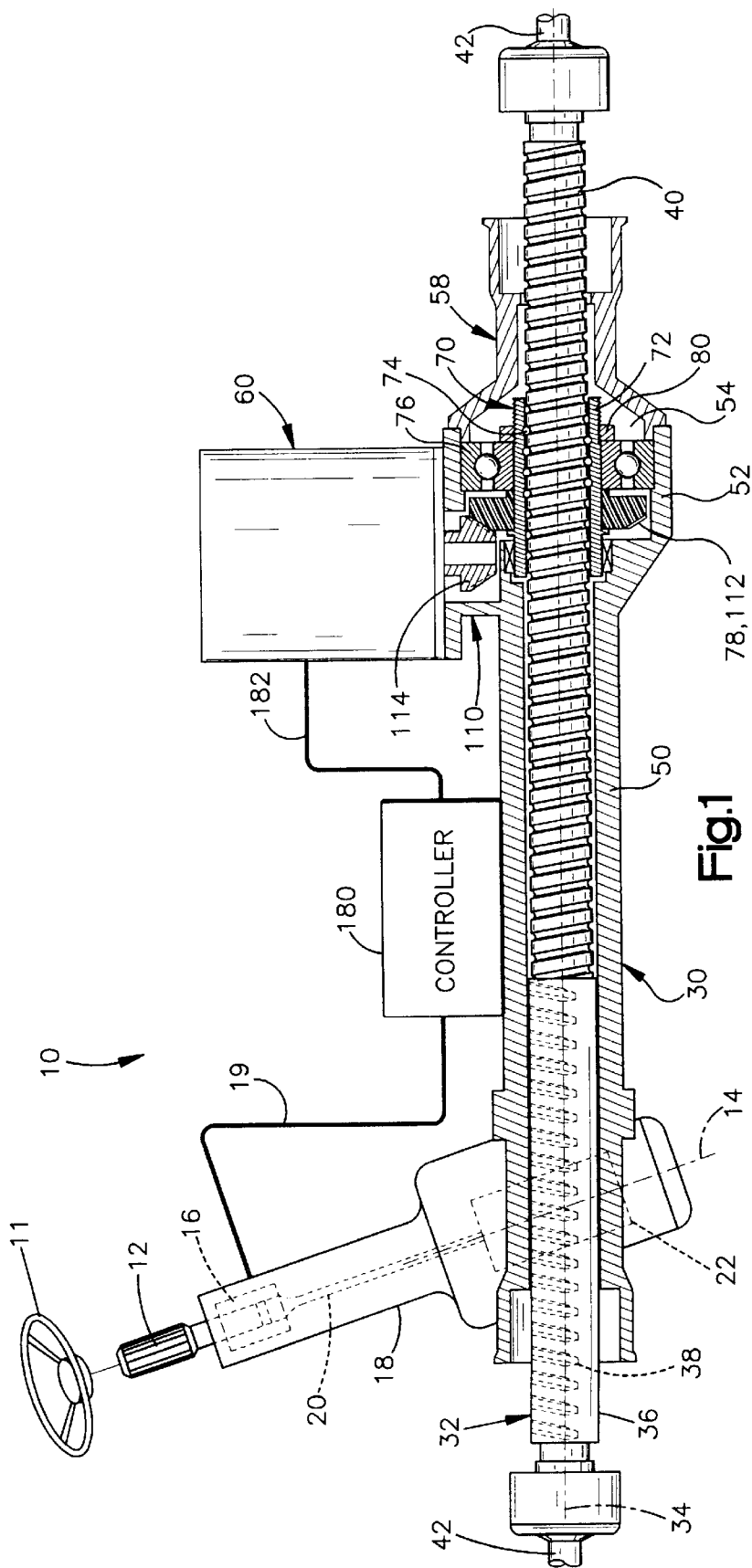
FIG. 1 is a schematic view, partially in section, of an electric power steering assembly constructed in accordance with the present invention.

The present invention relates to an electric power steering assembly and, in particular, relates to an electric power steering assembly which includes a ball nut for transmitting force from an electric motor to a steering rack and an electric motor to cause steerable vehicle wheels to turn. As representative of the present invention, FIG. 1 illustrates an electric power steering assembly 10 for a vehicle, such as an automobile.

The steering assembly 10 includes a vehicle steering wheel 11 and a rotatable input shaft 12 which is operatively coupled, in a manner not shown, for rotation with the steering wheel about a steering axis 14. A torque sensor 16 is located inside a pinion housing 18 and encircles the input shaft 12. The torque sensor 16 includes coils (not shown) which respond to rotation of the input shaft 12 and output an electrical signal over electrical lines 19 indicative of the direction and magnitude of the applied steering torque.

A torsion bar 20 connects the input shaft 12 to a pinion 22 inside the pinion housing 18. The torsion bar 20 twists in response to steering torque applied to the steering wheel. When the torsion bar 20 twists, relative rotation occurs between the input shaft 12 and the pinion 22.

The pinion housing 18 is attached to a rack housing 30. A linearly movable steering member 32 extends axially through the rack housing 30. The steering member 32 is linearly (or axially) movable along a rack axis 34. A rack portion 36 of the steering member has a series of rack teeth 38 which meshingly engage gear teeth (not shown) on the pinion 22. The steering member 30 further includes a screw portion 40 having an external thread convolution 41. The steering member 32 is connected with steerable wheels (also not shown) of the vehicle through tie rods 42 located at the distal ends of the steering member. Linear movement of the steering member 32 along the rack axis 34 results in steering movement of the steerable wheels as is known in the art.

The rack housing 30 has a generally cylindrical configuration including an axially extending side wall 50 centered on the rack axis 34. A radially enlarged section 52 of the rack housing 30 is located at the right end (as viewed in FIG. 1) of the rack housing 30. The radially enlarged section 52 of the rack housing 30 defines an annular chamber 54. An outboard housing 58 is attached, in a manner not shown, to the radially enlarged section 52 of the rack housing 30 and closes the chamber 54.

The steering assembly 10 further includes an electric motor 60, described below in detail, drivably connected to a ball nut assembly 70, also described below in detail, for effecting axial movement of the steering member 32 upon rotation of the steering wheel. In the event of the inability of the electric motor 60 to effect axial movement of the steering member 32, the mechanical connection between the gear teeth (not shown) on the pinion 22 and the rack teeth 38 on the rack portion 36 of the steering member 32 permits manual steering of the vehicle.

The ball nut assembly 70 is located in the chamber 54 in the radially enlarged section 52 of the rack housing 30 and encircles the screw portion 40 of the steering member 32. The ball nut assembly 70 includes a ball nut 72, a plurality of force transmitting members 74, a first bearing assembly 76, a gear member 78, and a lock nut 80. The ball nut 72 (FIG. 2) has oppositely disposed first and second end portions 82 and 84, respectively, and generally cylindrical inner and outer surfaces 86 and 88, respectively, extending between the end portions. A screw thread convolution 90 is formed on the cylindrical inner surface 86 of the ball nut 72. The first end portion 82 of the ball nut 72 projects axially toward the side wall 50 of the rack housing 30 and is supported by a second bearing assembly 92, shown schematically in the figures. Preferably, the second bearing assembly 92 is a needle bearing, but could instead be a ball baring or a journal bearing. The gear member 78 and the first bearing assembly 76 abut one another and are fixedly attached to the cylindrical outer surface 88 of the ball nut 72 in a central portion 94 of the ball nut. The lock nut 80 screws onto threads 96 formed in the cylindrical outer surface 88 in the second end portion 84 of the ball nut 72 to axially secure the parts of the ball nut assembly 70.

The plurality of force-transmitting members 74 comprise balls 98 disposed between the internal screw thread convolution 90 of the ball nut 72 and the external thread convolution 41 on the screw portion 40 of the steering member 32. The balls 98 are loaded into the ball nut assembly 70 in a known manner. The ball nut assembly 70 includes a recirculation passage (not shown) for recirculating the balls 98 upon axial movement of the steering member 32 relative to the ball nut assembly 70. In accordance with a preferred embodiment of the invention, the ball nut assembly 70 provides a gear reduction ratio between the ball nut 72 and the steering member 32 of between 5:1 and 10:1, and is preferably approximately 6.5:1.

The electric motor 60 is adjustably mounted to a radially extending gearbox portion 110 of the rack housing 30. The gearbox portion 110 extends from the radially enlarged section 52 of the rack housing 30. The gearbox portion 110 contains meshed first and second gears 112 and 114, respectively. The first gear 112 is the gear member 78 of the ball nut assembly 70. The first gear 112 rotates with the ball nut assembly 70 about the rack axis 34. The second gear 114 is connected for rotation with a motor output shaft 118 extending from the electric motor 60. The second gear 114 and the motor output shaft 118 rotate about a motor axis 120. The meshed first and second gears 112, 114 provide a gear reduction ratio between the motor output shaft 118 of the electric motor 60 and the ball nut assembly 70 of between 2:1 and 5:1, and is preferably approximately 3:1. When the gear reduction ratio of the ball nut assembly 70 is combined with the gear reduction ratio of the gears 112 and 114, an overall gear reduction ratio of at least 18:1 for the steering assembly 10 is preferably achieved.

In accordance with a preferred embodiment of the invention, the motor axis 120 extends transverse to the steering member 32 at a right angle. It is contemplated, however, that the motor axis 120 could lie parallel to the steering member 32 or at a different angle, such as 45°, relative to the steering member.

In further accordance with the preferred embodiment of the invention, the first and second gears 112 and 114 comprise a set of spiral-bevel gears. It should be understood that the first and second gears 112 and 114 could alternatively be a set of spiroid gears, hypoid gears, helical gears, bevel gears, or worm gears. The first gear 112 is preferably made of a plastic material and the second gear 114 is preferably made of metal so that, when meshed, the gears produce a relatively low level of noise.

Figure 2:
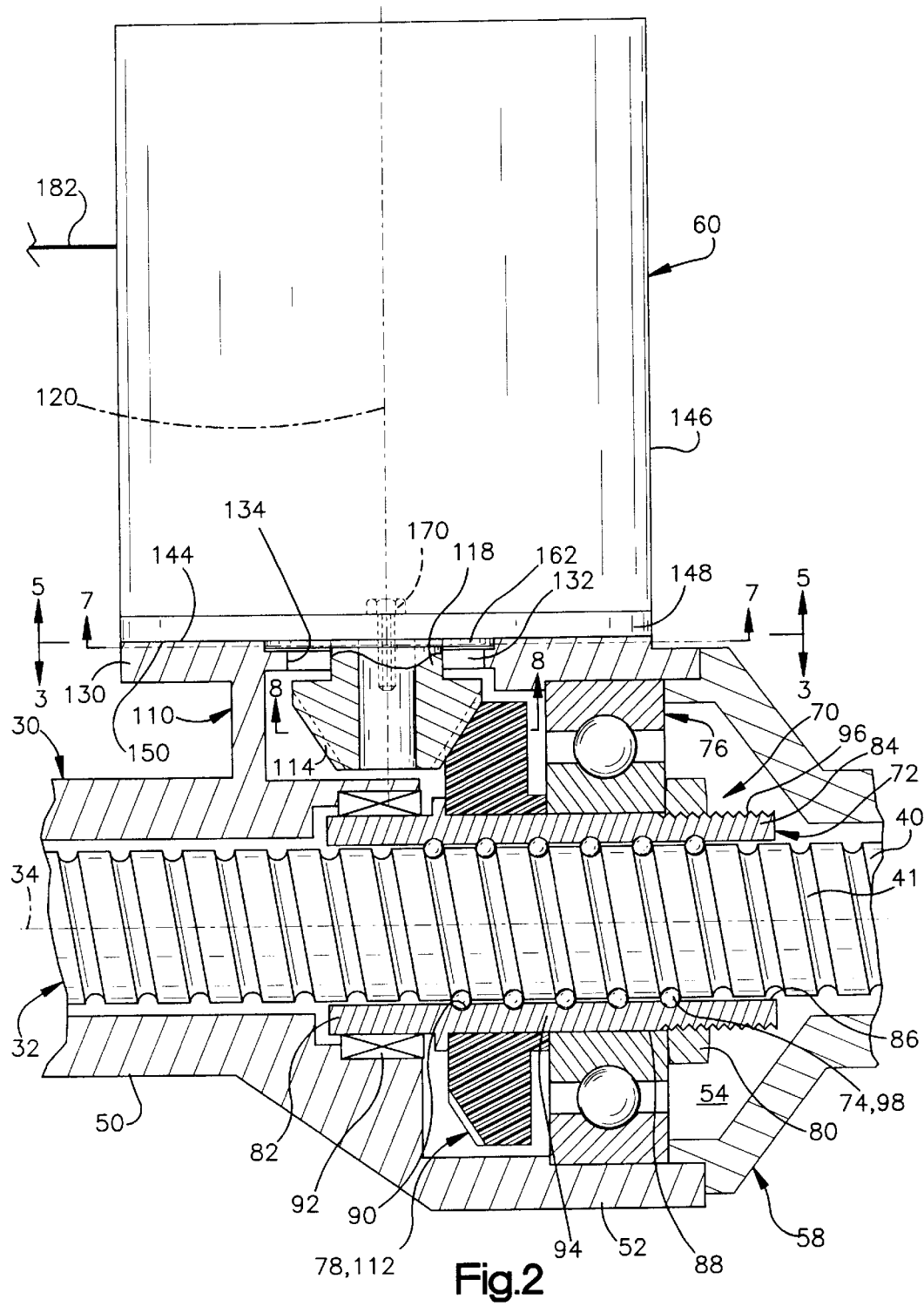
FIG. 2 is an enlarged view of a portion of FIG. 1.
Figure 3:
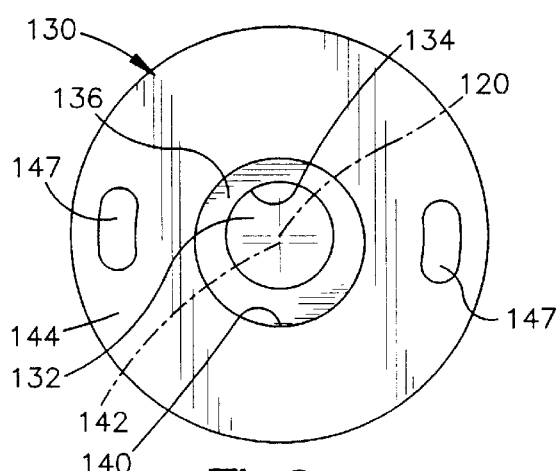
FIG. 3 is a view taken along line 3—3 in FIG. 2 with parts omitted for clarity.
Figure 4:
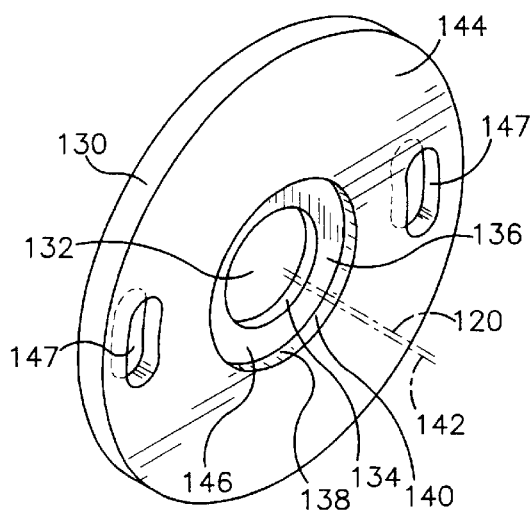
FIG. 4 is a perspective view of the parts shown in FIG. 3.

The gearbox portion 110 of the rack housing 30 includes a mounting flange 130 oriented perpendicular to the motor axis 120. The mounting flange 130 has a first opening 132 defined by a cylindrical inner surface 134 (FIGS. 2 and 3). The first opening 132 is centered on the motor axis 120 and is larger in diameter than the motor output shaft 118 to which the second gear 114 is attached. A radially extending surface 136 (FIG. 3) connects the first opening 132 to a second opening 138 (FIG. 4) in the mounting flange 130. The second opening 138 is defined by a cylindrical inner surface 140 which is not centered on the motor axis 120 but is instead centered on an eccentric axis 142. The cylindrical inner surface 140 intersects a radially extending mounting surface 144 of the mounting flange 130 and defines an eccentric depression 146 in the mounting flange. The mounting flange 130 further includes a pair of diametrically opposed slots 147.

Figure 5:
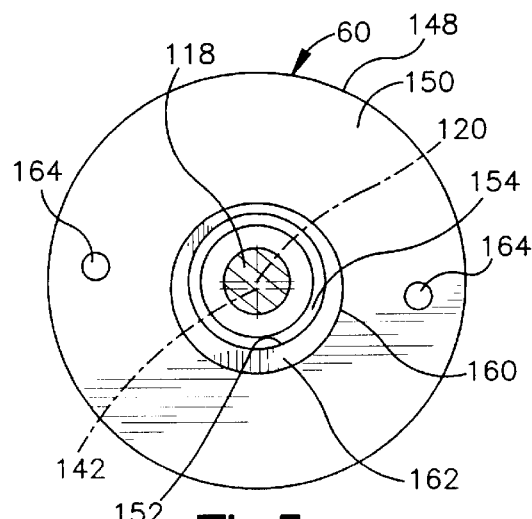
FIG. 5 is a view taken along line 5—5 in FIG. 2.
Figure 6:
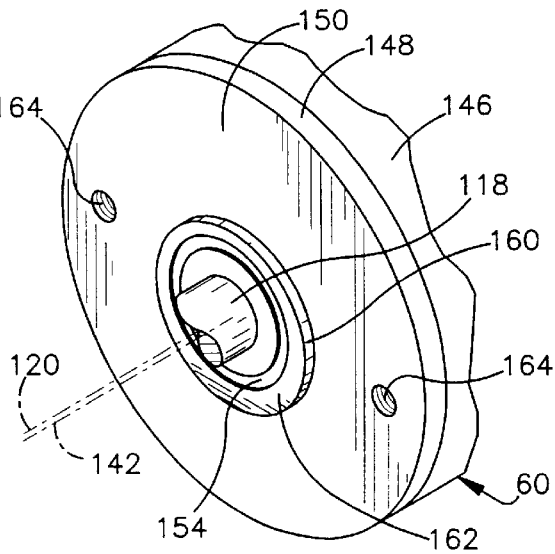
FIG. 6 is a perspective view of FIG. 5.

The electric motor 60 is a known type for use in an electric steering system. The electric motor 60 has a motor housing 146 (FIG. 2) which is generally cylindrical in shape. A mounting plate 148 is secured to one end of the motor housing 146. The mounting plate 148 has a radially extending mounting surface 150 (FIGS. 5 and 6) and a cylindrical inner surface 152 centered on the motor axis 120. A bearing assembly 154 is press fit into an opening (not numbered) defined by the cylindrical inner surface 152 and supports the motor output shaft 118 for rotation about the motor axis 120.

The mounting plate 148 of the electric motor 60 further includes a cylindrical outer surface 160 which projects axially from the mounting surface 150. The cylindrical outer surface 160 is centered on the eccentric axis 142 and defines an eccentric projection 162. The eccentric projection 162 is slightly smaller in diameter than the eccentric depression 146 in the mounting flange 130. The mounting plate 148 further includes a pair of diametrically opposed tapped holes 164.

Figure 7:
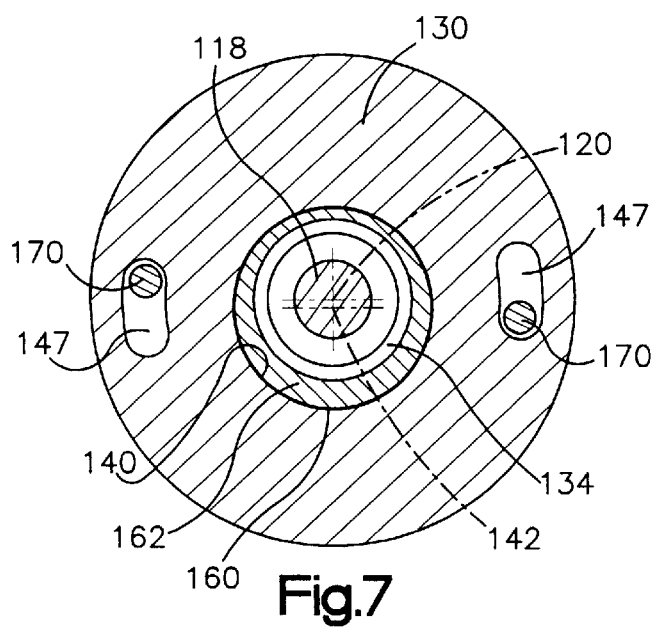
FIG. 7 is a view taken along line 7—7 in FIG. 2 showing parts of the steering assembly in a first position.

The eccentric projection 162 on the mounting surface 150 of the electric motor 60 is received in the eccentric depression 146 in the mounting flange 130 (see FIGS. 2 and 7). The radially extending surfaces 144 and 150 on the mounting flange 130 and the mounting plate 148, respectively, abut one another. The slots 147 in the mounting flange 130 overlie the tapped holes 164 in the mounting plate 148. A screw 170 extends through each of the slots 147 and is received in a respective one of the tapped holes 164 to secure the electric motor 60 to the mounting flange 130.

The steering assembly 10 further includes an electronic control unit or controller 180 (FIG. 1). The controller 180 is preferably secured to the rack housing 30 in a manner not shown. The controller 180 is electrically connected to the electric motor 60 by electrical lines 182 and is electrically connected by the electrical lines 19 to the torque sensor 16. The controller 180 is operable to receive electrical signals from the torque sensor 16 and to control the electric motor 60 in accordance with the received electrical signals.

When steering torque is applied to the vehicle steering wheel, the input shaft 12 rotates about the axis 14. The direction and magnitude of the applied steering torque are sensed by the torque sensor 16. The torque sensor 16 outputs an electrical signal to the controller 180. The electric motor 60 is energized by a control signal transmitted to the electric motor 60 by the controller 180, and the motor output shaft 118 of the electric motor 60 is caused to rotate about the motor axis 120.

The rotating motor shaft 118 applies a drive force to the second gear 114. The second gear 114, which is meshed with teeth on the first gear 112, effects rotation of the first gear and the ball nut 70 about the rack axis 34 at a reduced speed compared to the rotational speed of the motor shaft 118. The first and second gears 112 and 114 thus transmit the drive force of the electric motor 60 to the ball nut 70.

The rotation of the ball nut 70 results in linear movement of the steering member 32. The balls 98 transmit the rotation force of the ball nut 70 to the rack portion 36 of the steering member 32. Because the ball nut 70 is fixed in position axially, the steering member 32 is driven to move axially in response, effecting steering movement of the steerable wheels of the vehicle. The electric motor 60 thus provides steering assist in response to the applied steering torque.

Figure 8:
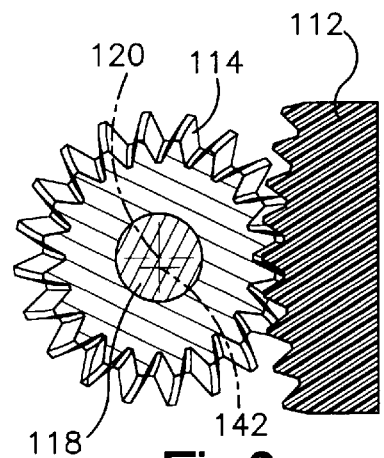
FIG. 8 is a view taken along line 8—8 in FIG. 2 further illustrating the parts of the steering assembly in the first position.
Figure 9:
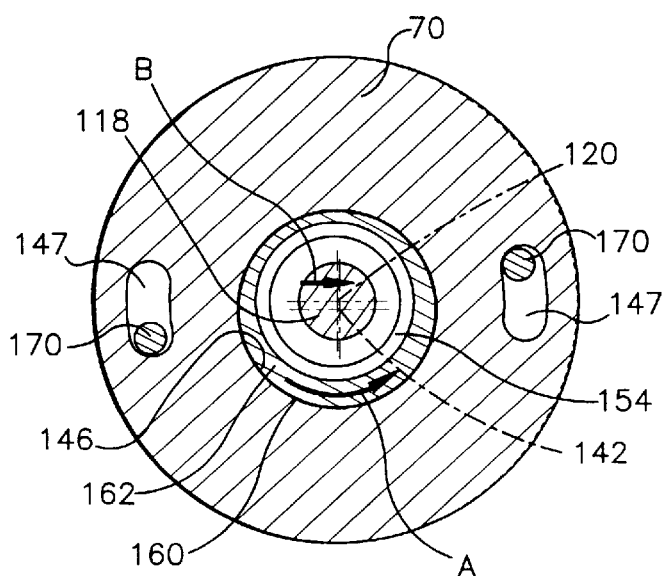
FIG. 9 is a view similar to FIG. 7 showing the parts of the steering assembly in a second position.
Figure 10:
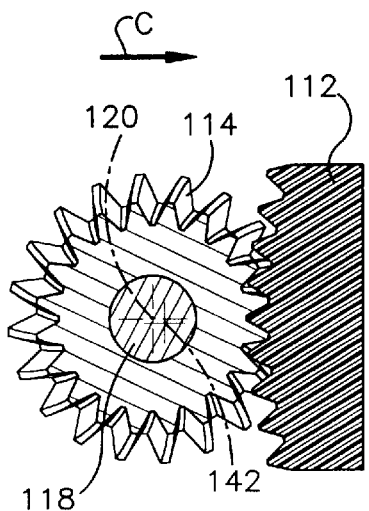
FIG. 10 is a view similar to FIG. 8 further illustrating the parts of the steering assembly in the second position.

The surfaces 140 and 160 on the gearbox portion 110 of the rack housing 30 and electric motor 60, respectively, provide the steering assembly 10 with a means for adjusting backlash in the gears 112, 114 between the electric motor 60 and the ball nut 70. FIGS. 7 and 8 show the relative position of the first and second gears 112 and 114 in a first condition where backlash requires adjustment. To adjust the backlash, the screws 170 are loosened and the electric motor 60 is manually rotated about the eccentric axis 142 in the direction of arrow A in FIG. 9. This manual rotation of the electric motor 60 slides the eccentric surface 160 of the projection 162 along the surface 140 of the depression 146 in the gearbox portion 110 of the rack housing 30 and causes the motor axis 120 of the electric motor output shaft 118 to shift in the direction of arrow B in FIG. 9. As shown in FIG. 10, this shifting of the motor axis 120 about which the motor output shaft 118 rotates moves the second gear 114 toward the first gear 112 in the direction of arrow C and into a second condition for the first and second gears 112 and 114 where the backlash has been adjusted. The first and second conditions shown in FIGS. 7–10 are intended to be of a representative nature only. It should be understood that numerous relative positions of the first and second gears 112 and 114 are possible.

The present invention thus provides a steering assembly 10 in which the backlash between the gears 112 and 114 is easily manually adjusted. Backlash adjustments can thus be made upon assembly of the steering assembly 10 by the part manufacturer, the vehicle manufacturer, or by a mechanic at a later time as required.

Further, the present invention provides a steering assembly 10 which is compact in size, relatively inexpensive to produce, and which has high strength and a high gear reduction ratio.

From the above description of the invention, those skilled in the art will perceive improvements, changes and modifications. Such improvements, changes and modifications within the skill of the art are intended to be covered by the appended claims.

Having described the invention, I claim:

1. A steering assembly for turning steerable wheels of a vehicle in response to rotation of a vehicle steering wheel, said steering assembly comprising:

a housing;

a member which is movable axially within said housing to effect turning movement of the steerable wheels, said member having an externally threaded screw portion;

a ball nut disposed in said housing, said ball nut extending around said screw portion of said member and having an internal thread;

a plurality of balls disposed between said internal thread on said ball nut and said externally threaded screw portion of said member for transmitting force between said ball nut and said screw portion to cause axial movement of said member along a first axis;

an electric motor for providing a drive force to move said member in response to rotation of the steering wheel, said electric motor including a rotatable output shaft which is rotatable about a motor axis which extends transverse to said member and which intersects said first axis; and gearing for transmitting the drive force of said electric motor to said ball nut, said gearing providing a first gear reduction between said output shaft of said electric motor and said ball nut.

2. The steering assembly of claim 1 further comprising a pinion connected with the vehicle steering wheel, said member having a rack portion for engagement with said pinion.

3. The steering assembly of claim 2 further comprising an input shaft connected between said pinion and the vehicle steering wheel and a torque sensor associated with said input shaft, said torque sensor being operable to sense rotation and steering torque applied to said input shaft and to provide a corresponding electrical signal.

4. The steering assembly of claim 3 further comprising a controller electrically connected to said torque sensor and to said electric motor, said controller being operable to receive electrical signals from said torque sensor and to control said electric motor in accordance with the electrical signals.

5. The steering assembly of claim 1 wherein said gearing comprises first and second bevel gears, said first bevel gear being fixed for rotation with said ball nut about said first axis that extends transverse to said motor axis, said second bevel gear being fixed for rotation with said output shaft of said electric motor about said motor axis.

6. The steering assembly of claim 5 wherein said first and second gears are contained within said housing, said electric motor being adjustably mounted to said housing.

7. The steering assembly of claim 5 wherein said first gear is made of a plastic material.

8. The steering assembly of claim 5 wherein said second gear is made of metal.

9. The steering assembly of claim 1 wherein said first gear reduction between said output shaft of said electric motor and said ball nut has a ratio of at least 3:1.

10. The steering assembly of claim 9 wherein said ball nut provides a second gear reduction between said ball nut and said member, said second gear reduction having a ratio of at least 6:1.

11. The steering assembly of claim 10 wherein said first and second gear reductions provide an overall gear reduction between said electric motor and said member having a ratio of at least 18:1.

12. The steering assembly of claim 1 further including at least one bearing assembly disposed between said housing and said ball nut for supporting rotation of said ball nut.

13. The steering assembly of claim 12 wherein said first gear is located axially between first and second bearing assemblies.

14. A steering assembly for turning steerable wheels of a vehicle in response to rotation of a vehicle steering wheel, said steering assembly comprising:

a housing;

a member which is movable axially within said housing to effect turning movement of the steerable wheels, said member having an externally threaded screw portion;

a ball nut disposed in said housing, said ball nut extending around said screw portion of said member and having an internal thread;

a plurality of balls disposed between said internal thread on said ball nut and said externally threaded screw portion of said member for transmitting force between said ball nut and said screw portion to cause axial movement of said member;

an electric motor for providing a drive force to move said member in response to rotation of the steering wheel, said electric motor including a rotatable output shaft which is rotatable about a motor axis which extends transverse to said member;

gearing for transmitting the drive force of said electric motor to said ball nut, said gearing providing a first gear reduction between said output shaft of said electric motor and said ball nut;

said gearing comprising first and second gears, said first gear being fixed for rotation with said ball nut about a first axis, said second gear being fixed for rotation with said output shaft of said electric motor about said motor axis;

said first and second gears being contained within said housing, said electric motor being adjustably mounted to said housing; and adjusting means for adjusting backlash between said first and second gears, said adjusting means including eccentric surface means for shifting said motor axis of said electric motor and said second gear relative to said first gear.

15. The steering assembly of claim 14 wherein said eccentric surface means includes an annular projection extending axially from a first end of said electric motor.

16. The steering assembly of claim 15 wherein said annular projection has a cylindrical outer surface comprising a first eccentric surface which is centered in an eccentric axis, said eccentric axis extending parallel to and radially offset from said motor axis.

17. The steering assembly of claim 16 wherein said housing includes a second eccentric surface defining an opening for receiving said annular projection.

18. A steering assembly for turning steerable wheels of a vehicle in response to rotation of a vehicle steering wheel, said steering assembly comprising:

a housing;

a member which is movable axially within said housing to effect turning movement of the steerable wheels, said member having an externally threaded screw portion;

a ball nut disposed in said housing and extending around said screw portion of said member, said ball nut having an outer surface and an internal surface which is threaded, said ball nut including a first gear fixed to said outer surface for causing rotation of said ball nut about a first axis;

a plurality of balls disposed between said threaded internal surface of said ball nut and said externally threaded screw portion of said member for transmitting force between said ball nut and said screw portion to cause axial movement of said member;

an electric motor for providing a drive force to move said member in response to rotation of the steering wheel, said electric motor including a rotatable output shaft which is rotatable about a motor axis which extends traverse to said member;

a second gear meshed with said first gear for transmitting the drive force of said electric motor to said first gear on said ball nut, said second gear being fixed for rotation with said output shaft about said motor axis, said first and second gears providing a first gear reduction between said electric motor and said ball nut;

said first and second gears being contained within said housing, said electric motor being adjustably mounted to said housing; and adjusting means for adjusting backlash between said first and second gears, said adjusting means including eccentric surface means for shifting said motor axis of said electric motor and said second gear relative to said first gear.

19. The steering assembly of claim 18 wherein said eccentric surface means includes an annular projection extending axially from a first end of said electric motor.

20. The steering assembly of claim 19 wherein said annular projection has a cylindrical outer surface comprising a first eccentric surface which is centered in an eccentric axis, said eccentric axis extending parallel to and radially offset from said motor axis.

21. The steering assembly of claim 18 wherein said housing includes a second eccentric surface defining an opening for receiving said annular projection.

22. A steering assembly for turning steerable wheels of a vehicle in response to rotation of a vehicle steering wheel, said steering assembly comprising:

a housing;

a member which is movable axially within said housing to effect turning movement of the steerable wheels, said member having an externally threaded screw portion;

a ball nut disposed in said housing and extending around said screw portion of said member, said ball nut having an outer surface and an internal surface which is threaded, said ball nut including a first bevel gear fixed to said outer surface for causing rotation of said ball nut about a first axis;

a plurality of balls disposed between said threaded internal surface of said ball nut and said externally threaded screw portion of said member for transmitting force between said ball nut and said screw portion to cause axial movement of said member;

an electric motor for providing a drive force to move said member in response to rotation of the steering wheel, said electric motor including a rotatable output shaft which is rotatable about a motor axis which extends traverse to said member and which intersects said first axis; and a second bevel gear meshed with said first bevel gear for transmitting the drive force of said electric motor to said first bevel gear on said ball nut, said second bevel gear being fixed for rotation with said output shaft about said motor axis, said second bevel gear rotating about said motor axis which extends transverse to said first axis about which said first bevel gear rotates, said first and second bevel gears providing a first gear reduction between said electric motor and said ball nut.

23. The steering assembly of claim 22 further comprising a pinion connected with the vehicle steering wheel, said member including a rack portion for engagement with said pinion.

24. The steering assembly of claim 23 further comprising an input shaft connected between said pinion and the vehicle steering wheel and a torque sensor associated with said input shaft, said torque sensor being operable to sense rotation and steering torque applied to said input shaft and to provide a corresponding electrical signal.

25. The steering assembly of claim 24 further comprising a controller electrically connected to said torque sensor and to said electric motor, said controller being operable to receive electrical signals from said torque sensor and to control said electric motor in accordance with the electrical signals.

26. The steering assembly of claim 22 wherein said first and second bevel gears are contained within said housing, said electric motor being adjustably mounted to said housing.

27. The steering assembly of claim 22 wherein said first gear reduction between said output shaft of said electric motor and said ball nut has a ratio of at least 3:1.

28. The steering assembly of claim 27 wherein said ball nut provides a second gear reduction between said ball nut and said member, said second gear reduction having a ratio of at least 6:1.

29. The steering assembly of claim 28 wherein said first and second gear reductions provide an overall gear reduction between said electric motor and said member having a ratio of at least 18:1.

* * * * *